Patented June 30, 1936

2,045,588

UNITED STATES PATENT OFFICE 2,045,588

MANUFACTURE OF PYRAMIDONE

Michael N. Dvornikoff, St. Louis, Mo., assignor to Monsanto Chemical Company, St. Louis, Mo., a corporation of Delaware No Drawing. Application April 13, 1934,
Serial No. 720,435

8 Claims. (Cl. 260—45)

This invention relates to the manufacture of pyramidone from amino antipyrine and it has particular application to the method according to which the amino antipyrine is methylated by means of formaldehyde in the presence of formic acid as described, for example, in German Patents #360,423 and #431,164.

The object of the present invention is to provide a simple, inexpensive and convenient method of recovering pyramidone from the reacted formic acid-formaldehyde-amino antipyrine mixture.

When amino antipyrine is reacted with formaldehyde in the presence of a multimolar proportion of formic acid, pyramidone is formed in good yields. However, since pyramidone is a base it forms a salt-like addition product with the formic acid analogous to the addition product of aniline and hydrogen chloride. In order to recover the pyramidone the formic acid is neutralized by the addition of a base such as caustic soda or soda ash, whereby the free formic acid is converted to sodium formate and the pyramidone which is present as pyramidone formate is liberated. The pyramidone is then separated from the sodium formate solution by extraction with benzene. In order that this process may be operated economically it is essential that formic acid shall be recovered and regenerated in concentrated form. This has been done heretofore by evaporating the extracted sodium formate solution to dryness and subsequently liberating the formic acid with concentrated sulphuric acid. The procedure is costly and losses of a mechanical as well as chemical nature cannot be avoided.

I have now found that it is unnecessary, in order to remove the formic acid from the reaction mixture, to neutralize the formic acid and recover the same in the form of its salt for I have discovered that the pyramidone formate can be resolved into its components, pyramidone and formic acid, by subjecting the same to an elevated temperature, preferably under reduced pressure, whereby the formic acid present in free and combined form is liberated and evolved without impairing the pyramidone which remains as a solid residue. I have found that this resolution of pyramidone formate may be forced to completion readily. However it may, if desired, be facilitated by the introduction of a suitable inert, non-oxidizing vapor such as steam, carbon dioxide, and nitrogen, or with the aid of an inert liquid such as toluol, xylene, petroleum ether, etc. My process not only avoids the cumbersome and expensive recovery of formic acid from its salt but also enables one to obtain a product which is of a quality that is as good, if not better, than that obtained when the formic acid is recovered by former methods, thus indicating that the decomposition of the pyramidone formate is unaccompanied by undesirable pyrogenetic reactions.

The following examples illustrate embodiments of my invention:

An aqueous solution containing equimolecular quantities of pyramidone and formic acid is concentrated by heating on the water bath in vacuo whereby the water is volatilized and subsequently formic acid is liberated and evolved. When using a vacuum equivalent to 12 mm. the resolution will be found to be complete in approximately two hours as evidenced by the fact that the pyramidone is practically neutral to phenolphthalein after this period of time.

To facilitate the removal of the acid from the pyramidone, steam may be introduced into the flask at 100° C.–110° C. Under these conditions the evolution of formic acid will be found to be complete in one to two hours. Alternatively, one may introduce carbon dioxide, hydrogen or nitrogen at diminished pressure and 130° C.–140° C. The evolution of the acid will be found to be complete in one to two hours.

Obviously, the time specified in the foregoing examples will vary according to the conditions of agitation, if any, the surface of contact, etc. It is to be noted, however, that while for most purposes it is desirable to remove as much of the formic acid as possible in order that the recovery of pyramidone will be of corresponding magnitude, it is unnecessary to effect complete removal since the residue may be extracted with water whereby residual amounts of the pyramidone formate are eliminated. The pyramidone formate is recovered conveniently from aqueous solution by evaporation and may be resolved into its components in a subsequent cycle.

The pyramidone obtained in the foregoing examples will be found to be only slightly discolored and the melting point will be found to have decreased one degree centigrade or even less. By avoiding contact with air or oxygen, the color and a high melting point can be maintained.

Pyramidone thus obtained may then be refined in the usual manner as, for example, by crystallization from ligroin.

The following example illustrates the application of the principles of my invention when the pyramidone is produced from anino antipyrine. To a mixture consisting of 98 grams of formaldehyde solution (1.19 mols), 109 grams of 85% formic acid (2.0 mols) and 20 cc. of water there is added dropwise and over a period of 2-3 hours while maintaining a temperature of 95° C.-100° C. and vigorously agitated conditions, a solution consisting of 101.5 grams of amino antipyrine (.5 mol.), 200 grams of water and 54 grams of formic acid (1.0 mol.). The temperature is maintained for approximately 8 hours after which the reaction mixture is concentrated by heating on the water bath under an absolute pressure of 15 mm. mercury. Water or steam is added slowly to the residue in order to facilitate the evolution and removal of combined formic acid.

When the amount of formic acid recovered is equivalent to 1.75 mols, the heating is discontinued and the residue is treated with 70 cc. of water, cooled, filtered and washed with 30 cc. of water. The mother liquor and washings will, upon evaporation and repeated steaming operations under vacuo as described above, result in the recovery of approximately 35 grams of pyramidone. The two batches of pyramidone so obtained may be crystallized either separately or combined together by means of petroleum ether in the well known manner. For this purpose 100 parts of petroleum ether containing 3 or 4 cc. of water which is slightly alkaline will be found particularly effective in obtaining a crystallized product of excellent quality in good yields.

From the foregoing it will be evident that I have provided a method of producing pyramidone from amino antipyrine which avoids the customary chemical means of recovering the formic acid. Specifically, it makes possible the avoidance of a caustic soda treatment and regeneration of strong formic acid from its sodium salt. Moreover, the pyramidone is obtained directly in a form suitable for crystallization from ligroin thus avoiding the usual benzol extraction. It is to be understood that the invention is not limited to the conditions of pressure and temperature specified or time of treatment and that the invention is susceptible to various modifications without departing from the principles herein set forth.

What I claim is:

1. The method of recovering pyramidone from the formic acid solution of pyramidone formate which comprises evaporating the solution of free formic acid and subjecting the residue to an elevated temperature to liberate the formic acid which is chemically combined with the pyramidone, while avoiding thermal decomposition of the residual pyramidone.

2. The method as defined in claim 1 and further characterized in that the evolution of formic acid is effected under reduced pressure conditions.

3. The method as defined in claim 1 and further characterized in that the evolution and removal of formic acid is facilitated by the introduction of an inert volatile fluid medium.

4. The method as defined in claim 1 and further characterized in that the evolution and removal of formic acid is facilitated by the introduction of an inert gaseous medium.

5. The method as defined in claim 1 and further characterized in that the evolution and removal of formic acid is facilitated by the introduction of an inert liquid medium.

6. The method as defined in claim 1 and further characterized in that it is applied directly to the reacted mixture of aqueous formaldehyde, formic acid and amino antipyrine.

7. A method of recovering pyramidone from a formic acid solution of pyramidone formate, which comprises evaporating the free formic acid and subjecting the residue to a temperature of at least 100° C. to liberate the combined formic acid.

8. A method as defined in claim 7 and further characterized in that the temperature of reaction does not materially exceed 140° C.

MICHAEL N. DVORNIKOFF.